(12) United States Patent
Denning et al.

(10) Patent No.: US 8,505,493 B2
(45) Date of Patent: Aug. 13, 2013

(54) LIVESTOCK INSECT-REMOVAL SYSTEMS AND RELATED METHODS

(71) Applicant: North Carolina State University, Raleigh, NC (US)

(72) Inventors: Steven S. Denning, Raleigh, NC (US); David Wesley Watson, Sanford, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 13/668,215

(22) Filed: Nov. 3, 2012

(65) Prior Publication Data
US 2013/0125830 A1    May 23, 2013

Related U.S. Application Data

(60) Provisional application No. 61/563,053, filed on Nov. 23, 2011.

(51) Int. Cl.
*A01K 13/00*    (2006.01)
(52) U.S. Cl.
USPC ............................ 119/651; 119/652; 119/656
(58) Field of Classification Search
USPC .................. 119/651, 652, 656, 660, 659, 661, 119/662, 663, 664, 600, 622, 650, 678
See application file for complete search history.

(56) References Cited

U.S. PATENT DOCUMENTS

| 4,301,766 | A | * | 11/1981 | Piccone | 119/482 |
|---|---|---|---|---|---|
| 4,729,147 | A | * | 3/1988 | Armbruster | 15/314 |
| 5,768,748 | A | * | 6/1998 | Silvera et al. | 15/402 |
| 5,957,090 | A | * | 9/1999 | Larson | 119/600 |
| 6,230,660 | B1 | * | 5/2001 | Greeson | 119/665 |
| 7,011,044 | B2 | * | 3/2006 | Segura Jobal | 119/671 |
| 7,011,046 | B1 | * | 3/2006 | Kidwell | 119/678 |
| 7,980,200 | B2 | * | 7/2011 | Troutman | 119/651 |
| 8,176,652 | B2 | * | 5/2012 | Donahue et al. | 34/399 |

* cited by examiner

*Primary Examiner* — Yvonne Abbott
(74) *Attorney, Agent, or Firm* — Olive Law Group, PLLC

(57) ABSTRACT

Livestock insect removal systems and related methods are disclosed. According to one aspect, a system can comprise a structure defining a pathway for passage of livestock. The system can also comprise a duct including first and second ends defining first and second openings, respectively. The first opening is positioned along the pathway such that the livestock moving through the pathway passes near the first opening. Further, the system comprises a vacuum device connected to the second opening and configured to draw air through the duct and away from an area surrounding the first opening such that one or more insects are displaced from the livestock or an area surrounding the livestock when the livestock passes near the first opening. The displaced insects can be drawn into the duct for placement in an insect trap.

20 Claims, 8 Drawing Sheets

LIVESTOCK INSECT-REMOVAL SYSTEMS AND RELATED METHODS

CROSS REFERENCE TO RELATED APPLICATION

This application claims the benefit of U.S. Provisional Patent Application No. 61/563,053, filed Nov. 23, 2011 and titled LIVESTOCK INSECT-REMOVAL SYSTEMS AND RELATED METHODS, the content of which is hereby incorporated herein by reference in its entirety.

TECHNICAL FIELD

The disclosed subject matter relates to insect control. Particularly, the disclosed subject matter relates to livestock insect-removal systems and related methods.

BACKGROUND

The horn fly, *Hematobia irritans* (L.), is a persistent pest of pastured cattle and costs the cattle industry an estimated $730-876 million annually. When horn flies are abundant, cattle suffer from annoyance and blood loss, and alter their grazing habits. Behavioral changes may be manifested by decreased milk production, reduced weight gains and poor feeding efficiency. Horn fly densities of several hundred flies per animal are common among uncontrolled populations. Proposed economic thresholds for horn flies on cattle vary from 50 to 230 per animal; however, 200 flies per animal is the generally accepted standard.

The management of horn flies has traditionally relied on the use of insecticides applied as dusts, sprays, pour-on, boluses and feed activities, and insecticide impregnated ear tags. Pyrethroid ear tags were highly effective against the horn fly and densities below 50 flies per head were relatively easy to maintain until the development of resistance. Resistance is now widespread throughout most of North America and control has become increasingly difficult.

Pyrethroid resistance was suspected in the horn fly population associated with the dairy herd at the Center for Environmental Farming Systems (CEFS), located at Goldsboro, N.C. Traditionally, these cattle were treated with pyrethroid insecticides to manage the horn fly population. In spring 2000, pour-on pyrethroid insecticides were applied every 2 weeks to the milking cows. Despite this treatment, horn fly populations exceeded 200 flies per animal. Attempts to manage the horn fly population on the CEFS dairy herd using conventional pyrethroid insecticides was ineffective and an alternative to this method was needed. Changing formulations or active ingredients would be expected to reduce horn fly densities and improve production. However, certain insecticides are restricted from use on lactating dairy cattle. Furthermore, at least one research group found alternative insecticide treatments (organophosphate class) were not able to reduce fly densities to less than 50 flies per head, nor did the use of insecticides affect weight gains. The group surmised that the elimination of the horn fly was not possible in Florida and perhaps management around a 200 fly threshold was an attainable objective with added benefits to resistance management and reduced pesticide use.

Using multiple strategies for the management of pests and reduction of pesticides is the foundation of integrated pest management (IPM). Trapping insects may contribute significantly to the IPM program. An early attempt at trapping insects involved the use of a walk-through horn fly trap. This passive device, with subsequent modifications, was designed to brush flies from the animals and capture them in baffles until they died. Some researchers recognized that some horn flies momentarily left the host when cattle entered darkened fly traps thus avoiding capture. They modified the trap design with a translucent skin to increase ambient light with the trap resulting in fewer flies leaving the hosts before entering the trap.

As horn fly populations and other insect populations become increasingly difficult to control with insecticides, improved technology for removing such insects from livestock is desirable, especially for dairies. Further, it is desirable to provide effective and low-maintenance technology for removing insects from livestock without the use of insecticides.

SUMMARY

The subject matter disclosed herein relates to livestock insect removal systems and related methods. According to an aspect, a system can comprise a structure defining a pathway for passage of livestock. The system can also comprise a duct including first and second ends defining first and second openings, respectively. The first opening can be positioned along the pathway such that the livestock moving through the pathway passes near the first opening. Further, the system comprises a vacuum device connected to the second opening and configured to draw air through the duct and away from an area surrounding the first opening such that one or more insects are displaced from the livestock or an area surrounding the livestock when the livestock passes near the first opening. The displaced insects can be drawn into the duct for placement in an insect trap.

A system in accordance with the subject matter disclosed herein may include one or more ducts connected to the vacuum device for displacing insects from livestock or near livestock. The displaced insects can be drawn into the ducts by airflow generated inside the ducts by the vacuum device. A screen can prevent the insects or debris from reaching the mechanical components of the vacuum device.

An insect trap can be in airway communication with the duct(s) such that the displaced insects are deposited in or near the trap. The insect trap can have an open end for receiving the insects. Further, the insect trap can have an interior space for trapping the insects. The insect trap can be removably connected to the duct(s) such that the trapped insects can be discarded.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

The subject matter disclosed herein relates to livestock insect removal systems and related methods. In accordance with embodiments of the present disclosure, a system can comprise a structure defining a pathway for passage of livestock, such as cattle. The system can also comprise a duct including first and second ends defining first and second openings, respectively. The first opening is positioned along the pathway such that the livestock moving through the pathway passes near the first opening. Further, the system comprises a vacuum device connected to the second opening and configured to draw air through the duct and away from an area surrounding the first opening such that one or more insects (e.g., flies) are displaced from the livestock or an area surrounding the livestock when the livestock passes near the first opening. The displaced insects can be drawn into the duct for placement in an insect trap. As a result, insects may be removed from cattle passing through the pathway and held in the insect trap for subsequent removal or disposal.

Figure 1:
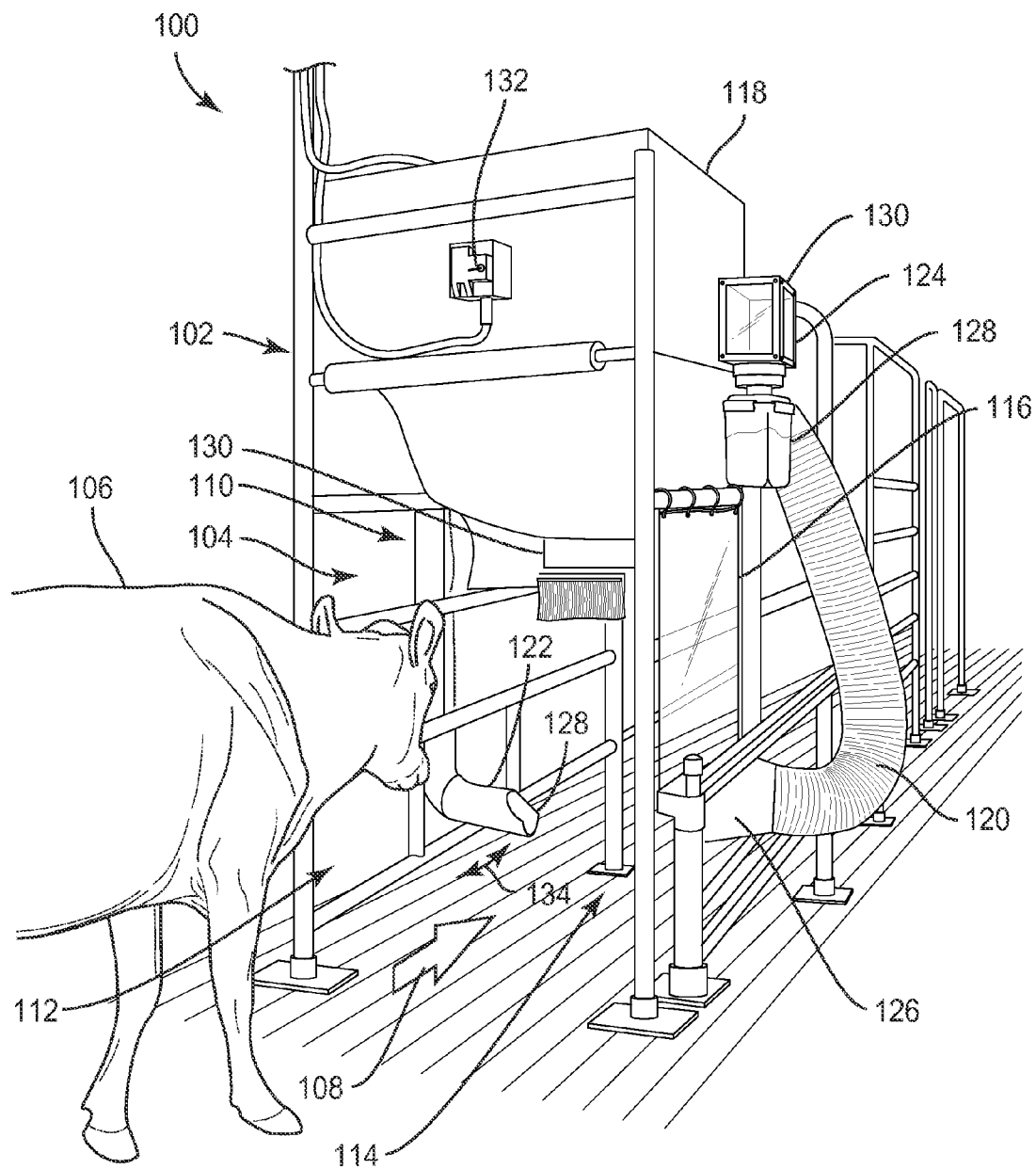
FIG. 1 is a perspective view of an example livestock insect-removal system in accordance with embodiments of the present disclosure.

FIG. 1 illustrates a perspective view of an example livestock insect-removal system 100 in accordance with embodiments of the present disclosure. Referring to FIG. 1, the system 100 includes a frame structure 102 that defines a pathway 104 for passage of livestock. In this example, the system 100 is configured for removal of insects from cattle, such as cow 106.

In an example operation of the system 100, the cow 106 may be directed to enter the defined pathway 104 by walking in a direction indicated by direction arrow 108. Generally, the livestock move through the pathway 104 in a single direction, but the system may be configured for allowing the livestock to move through the pathway 104 in the direction opposing arrow 108. The frame structure 102 defines a top 110, a left side 112, and a right side 114 of the pathway 104. The frame structure 102, in this example, includes a plurality of connected, metal-tube structures for defining the pathway 104 and supporting and/or carrying other components of the system 100; however, any suitable components and materials may be used for forming the frame structure 102.

In accordance with embodiments of the present disclosure, the frame structure 102 may be covered by a material for covering any gaps between the pieces of the frame structure 102. For example, a sheet of material 116 may be attached to the frame structure 102 for covering a gap between the tubing. In this way, insects can be prevented from passing therethrough and can increase the amount of insects captured. The material may include, but is not limited to, fabric, netting, screens, plastics, the like, or combinations thereof In the example shown in FIG. 1 and the other figures provided herein, the system 100 is configured with a size and dimensions suitable for cattle to pass through the pathway for removal of insects. However, it should be understood that the system is not limited to use with cattle. The system 100 may be configured to a different size and dimensions for allowing other types of livestock to move through the pathway for removal of insects.

A vacuum device (not shown in FIG. 1) can be held by a vacuum device container 118. More particularly, the container 118 may define an interior space for holding the vacuum device. The container 118 may also comprise several openings that lead to the interior space and that may be connected to ducts for providing an air pathway between the interior space of the container 118 and the ends of the ducts. For example, an input duct 120 can have an opening at one end for connecting to the container 118. Further, for example, an output duct 122 can have an opening at one end for connecting to the container 118. The opposing ends of ducts 120 and 122 can have openings such that the interior space of the container 118 has open air pathways to an exterior of the container 118.

In accordance with embodiments of the present disclosure, the container 118 can contain a light source for attracting insects. In this way, insects can be drawn into the container 118 and discouraged from leaving it. The light source may be configured to be turned on when the vacuum device is activated, and turned off when the vacuum device is deactivated to allow the insects to leave the vacuum device container and enter an insect trap 124.

Input duct 120 includes an end 126 connected to the right side 114 of the frame structure 102. The input duct 120 defines an opening (not shown in FIG. 1) positioned along the right side of the pathway 104 such that the cow 106 passes near the opening when the cow 106 moves along the pathway 104. When the vacuum device is activated or turned on, air is drawn through the input duct 120 and away from the area surrounding the opening defined by the end 126. As a result, insects on or around the cow 106 passing near the opening are drawn into the duct 120 and into the interior space of the container 118. Thereby, the cow 106 is relieved of the insects, which may be horn flies, common house flies, other flying insects, or other types of insects.

Output duct 122 includes an end 128 connected to left side 112 of the frame structure 102. The output duct 122 defines an opening positioned along the left side of the pathway 104 such that the cow 106 may pass near the opening when the cow 106 moves through the pathway 104. When the vacuum device is activated or turned on, output air is directed through the output duct 122 and towards the pathway 104. As a result, insects on or around the cow 106 as it passes near the opening may be dislodged from the cow 106 and directed to the opposing right side of the pathway 104 for intake by the input duct 120.

The system 100 may also comprise another input duct 130 connected the top side 110 of the frame structure 102. The input duct 130 defines an opening (not shown in FIG. 1) positioned along the top side of the pathway 104 such that a top portion of the cow 106 passes near the opening when the cow 106 moves through the pathway 104. When the vacuum device is activated or turned on, air is drawn through the input duct 130 and away from the area surrounding the top of the pathway. As a result, insects on or around the top portion of the cow 106 are drawn into the duct 130 and into the interior space of the container 118.

Insects drawn into the interior space of the container 118 can be contained or trapped within the container's interior space, or contained or trapped in the insect trap 124. The insect trap 124 can define an interior space for trapping insects. The interior of the insect trap 124 can be in air pathway communication with the interior of the container 118 such that the insects drawn into the interior of the container can move to the insect trap 124. A lower portion 129 of the insect trap can be disconnected from an upper portion 130 such that perished or living insects can be discarded. The insect trap 124 can be made of a transparent or at least partially transparent material such that insects in the interior of the container 118 are attracted to the light in the interior of the insect trap 124.

In accordance with embodiments of the present disclosure, the insect trap 124 may include a door or like mechanism for preventing insects from re-entering the vacuum device container 118. The door may be made of a rigid, flexible, or semi-flexible material. In an example, the door material may be opaque or transparent. The door may operate on a difference in pressure generated by activating a vacuum device, which is described in further detail herein. When the vacuum device is activated, the door may close to thereby prevent insects from re-entering the vacuum device container 118. After the vacuum device turns off, the door may open to allow insects into the insect trap. In an embodiment, the insect trap may be made of a material for allowing air to travel therein from the outside while still holding the insects. For example, a portion or the entirety of the insect trap may be made of a suitable mesh-type material.

The system includes a power switch 132 for manually turning on/off the vacuum device. Alternatively, the vacuum device can be automatically turned on/off based on entry of cattle into the pathway 104.

Figure 2:
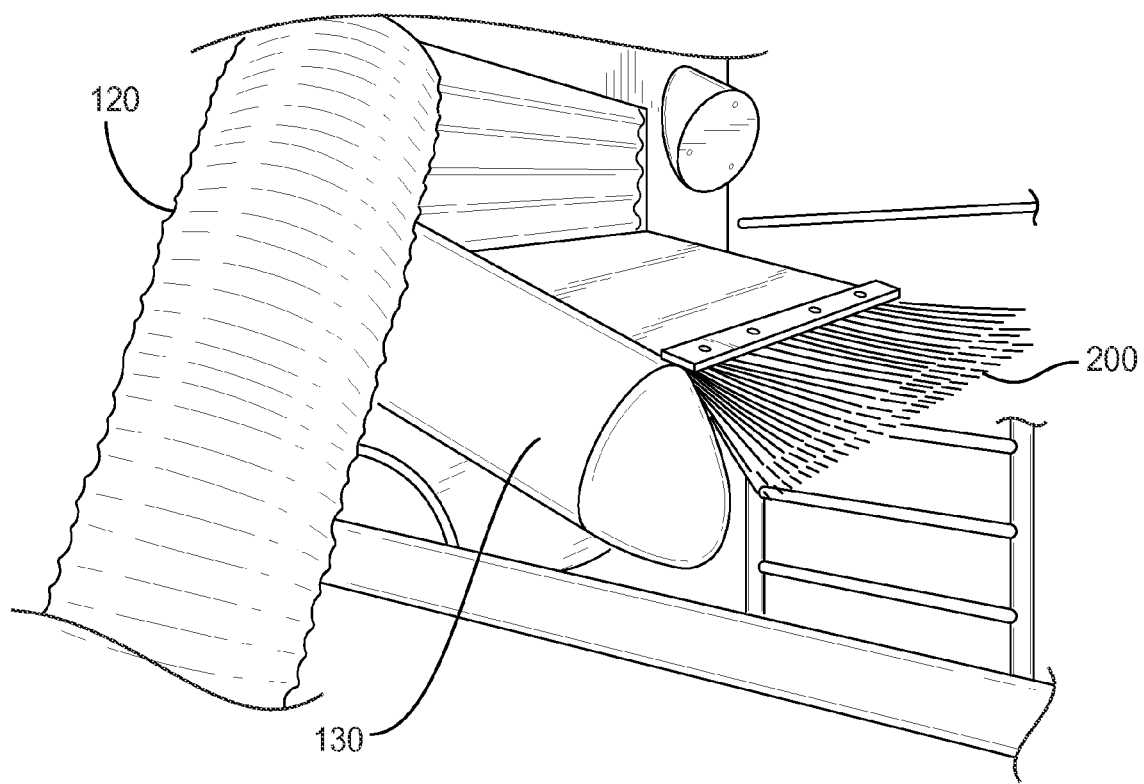
FIG. 2 is a perspective side view of an input duct when pivoted upward for moving along the contour of livestock in accordance with embodiments of the present disclosure.

FIG. 2 illustrates a perspective side view of the input duct 130 when pivoted upward for moving along the contour of livestock in accordance with embodiments of the present disclosure. Referring to FIG. 2, the input duct 130 may comprise brushes 200 attached to its end for dislodging or brushing insects from a top portion of the cattle. When the insects are dislodged, they can be more easily drawn into the input duct 130 and to the insect trap shown in FIG. 1.

Figure 3:
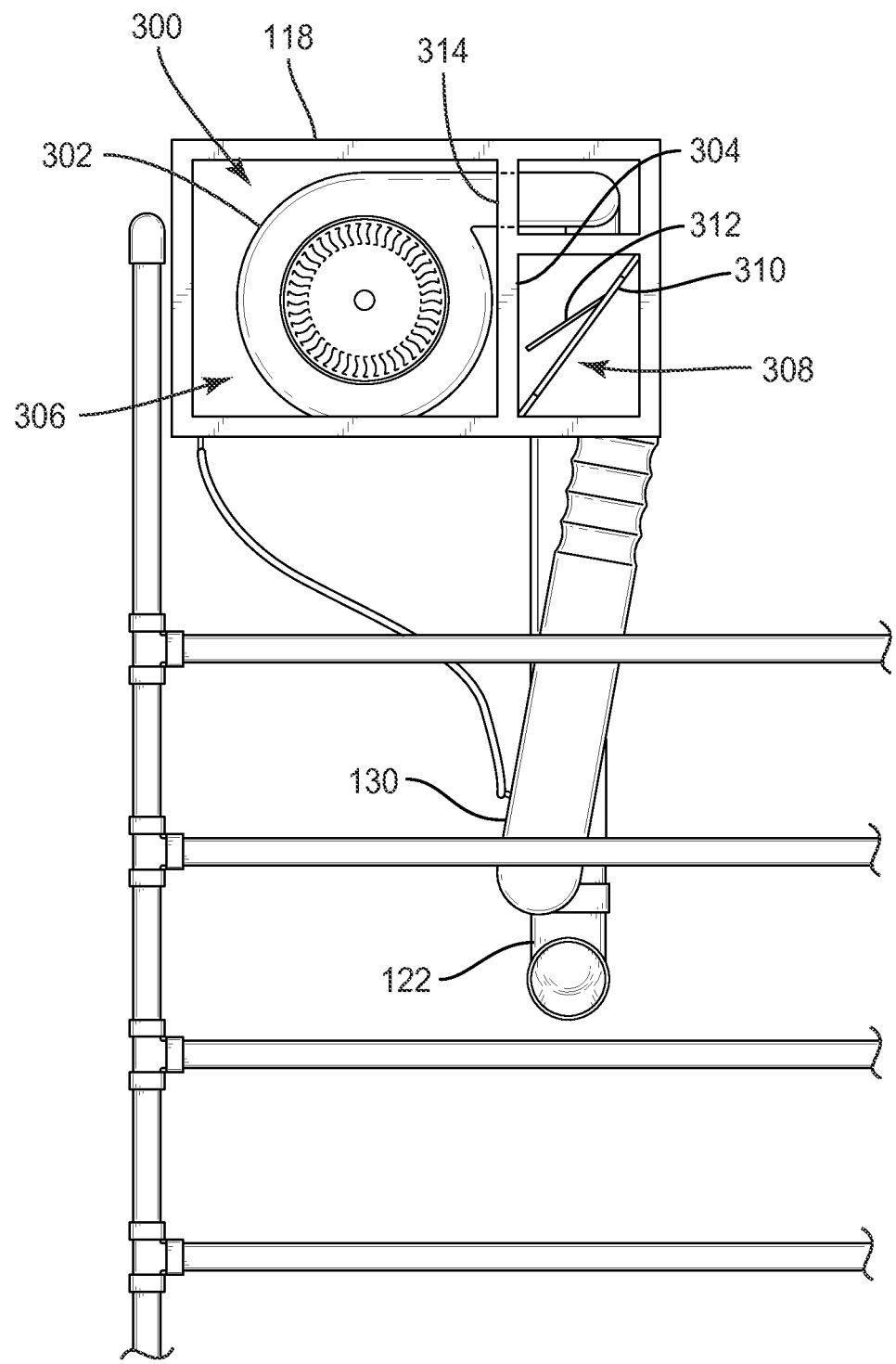
FIG. 3 is a side view an interior space of a vacuum device container, an input duct, and the output duct in accordance with embodiments of the present disclosure.

FIG. 3 illustrates a side view an interior space 300 of the vacuum device container 118, the input duct 130 and the output duct 122 in accordance with embodiments of the present disclosure. Referring to FIG. 3, a blower 302 is positioned within the interior space 300 and attached to the container 118. The blower 302 can generate a vacuum effect to pull air along with insects through the input duct 130 (and the input duct 120 shown in FIG. 1). Further, the blower 302 can expel air through the output duct 122, a component of which is shown disconnected in FIG. 3.

A screen 304 may partition the interior space 300 into two portions 306 and 308. The blower 302 can be contained within portion 306. Inlets 310 for connecting to ends of the ducts 120 and 130 are in direct air pathway communication with the portion 308. Insects drawn into the interior space 300 by the blower 302 may be confined to the portion 308 due to the screen 304. As a result, insects and debris pulled into the interior space 300 are prevented from reaching the components of the blower 302, which may damage the blower 302 or significantly reduce its effectiveness.

Inlets 310 may be fitted with a flexible, inlet door 312 that opens when the blower (or vacuum device) 302 is activated, and that close when the blower 302 is turned off. In this way, insects drawn into portion 308 are trapped within this portion when the blower is turned off. The inlet door 312 is shown in an open position in this example.

Figure 4:
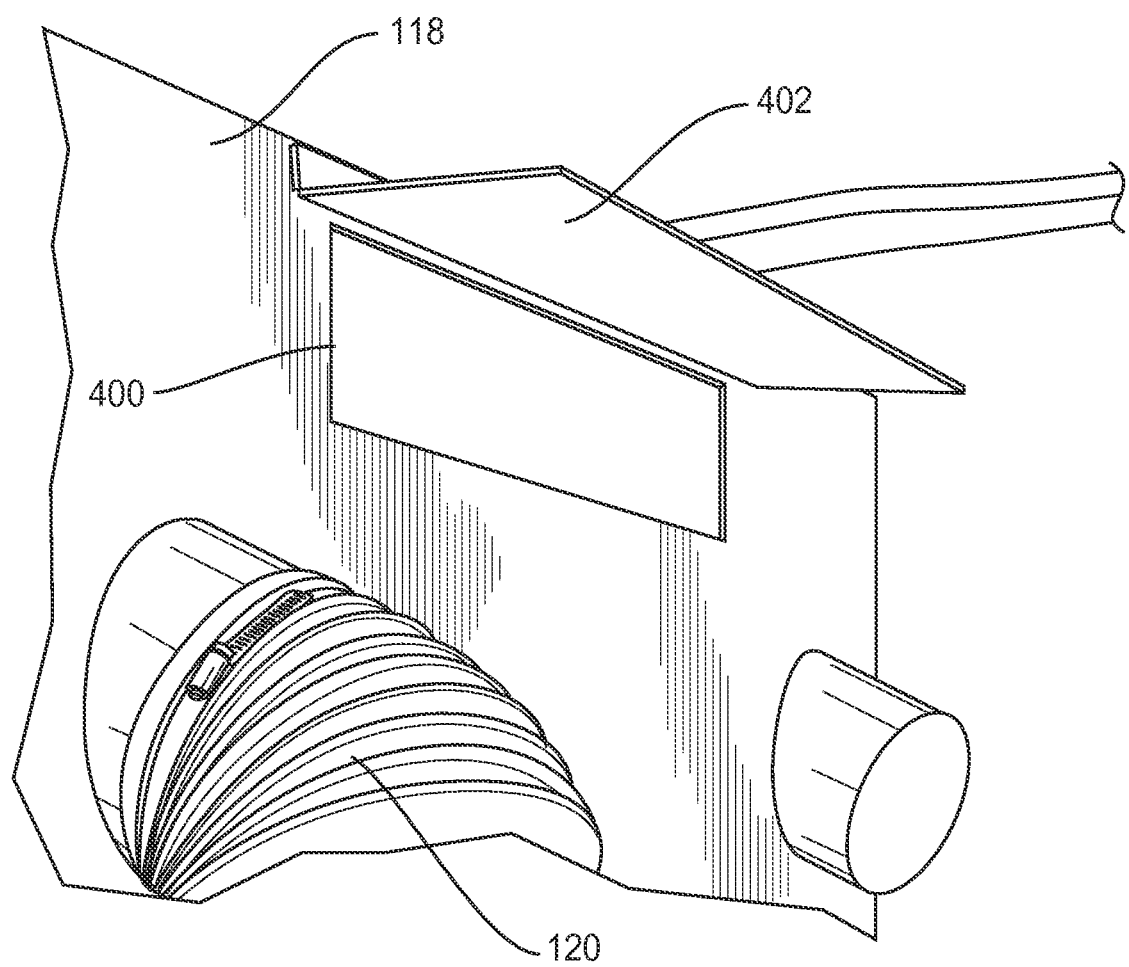
FIG. 4 is a perspective view of a rear portion of the container and a top portion of the input duct in accordance with embodiments of the present disclosure.

The output of the blower 302 is attached to a container outlet 314, which is also directly connected to the output duct 122. Accordingly, air output from the blower 302 may be moved through the output duct 122 for dislodging insects from livestock as described herein. FIG. 4 illustrates a perspective view of a rear portion of the container 118 and a top portion of the input duct 120 in accordance with embodiments of the present disclosure. Referring to FIG. 4, the container 118 includes an outlet 400 for expelling excess air generated by the blower 302 shown in FIG. 3. The outlet 400 can provide an air pathway between the interior space 300 and outside of the container 118. An outlet door 402 may be attached to the outlet 400. When the blower is activated, the door 402 may be forced open by the air. The door 402 may close when the blower is turned off such that the container 118 is sealed at the outlet 400.

Figure 5:
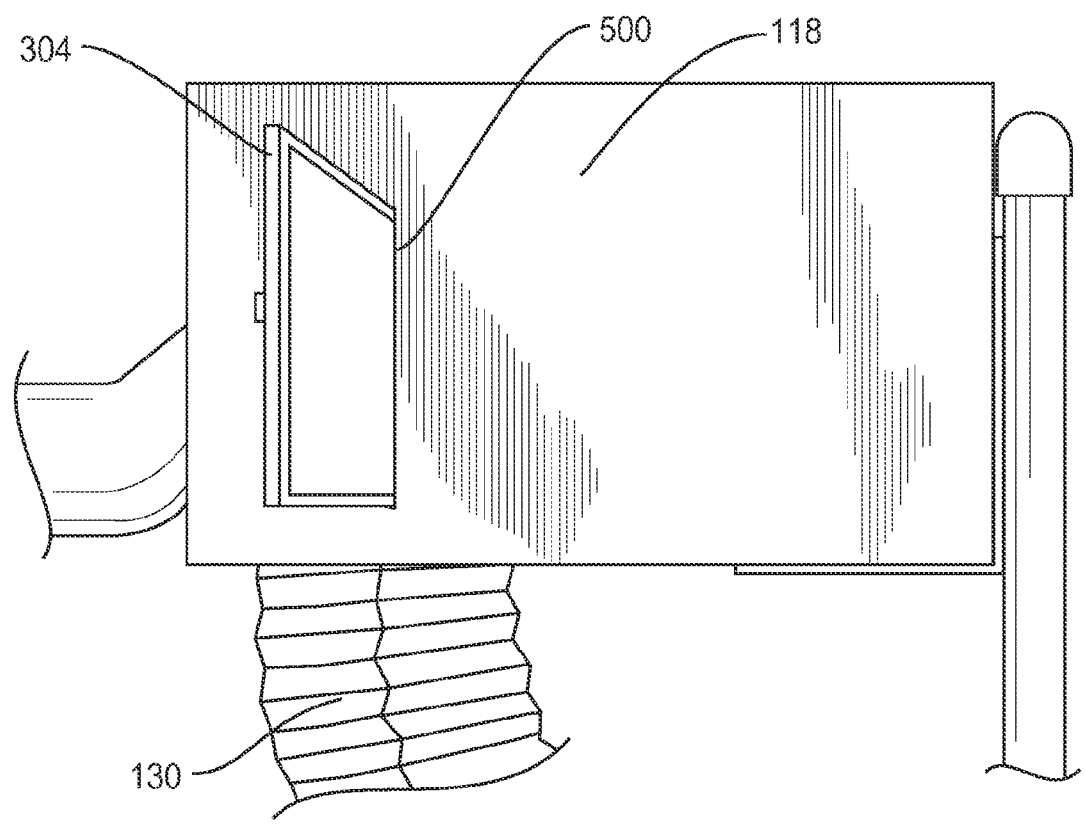
FIG. 5 is another perspective view of a side portion of an insect container and the screen shown in FIG. 1 in accordance with embodiments of the present disclosure.

FIG. 5 illustrates another perspective view of a side portion of the insect container 118 and the screen 304 in accordance with embodiments of the present disclosure. Referring to FIG. 5, the screen 304 can be removed from the interior of the container 118 for cleaning The screen 304 can be slid through an opening 500 of the container 118 to a position as shown in FIG. 5. After cleaning, the screen 304 may be re-inserted back into place within the container 118 for operation.

Figure 6:
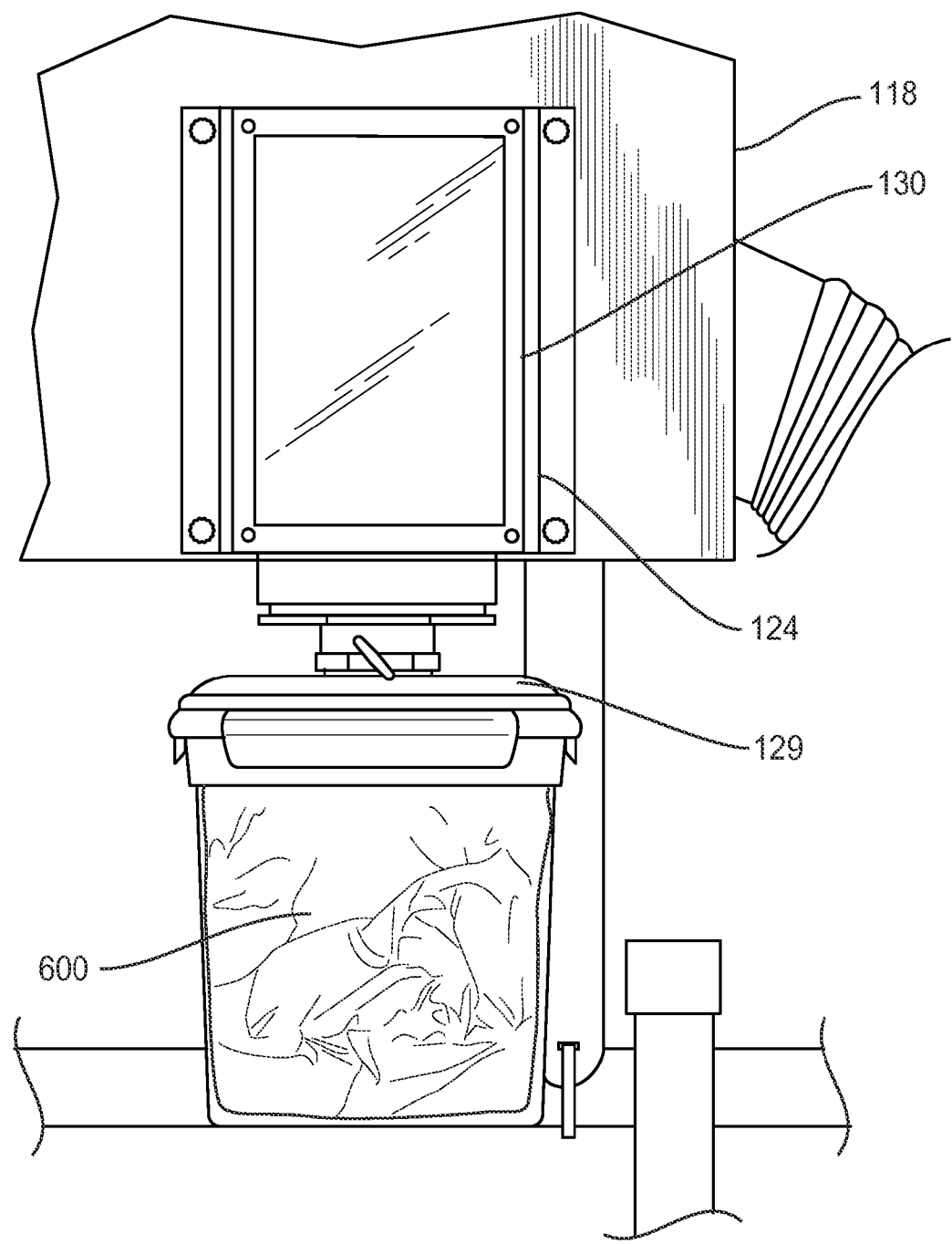
FIG. 6 is a side view of the insect trap of the system shown in FIG. 1.

FIG. 6 illustrates a side view of the insect trap 124 of the system 100 shown in FIG. 1. Referring to FIG. 6, the insect trap 124 is attached to the container 118. Further, the figure shows horn flies and common house flies 600 that have been captured in the lower portion 129 of the insect trap 124.

Figure 7:
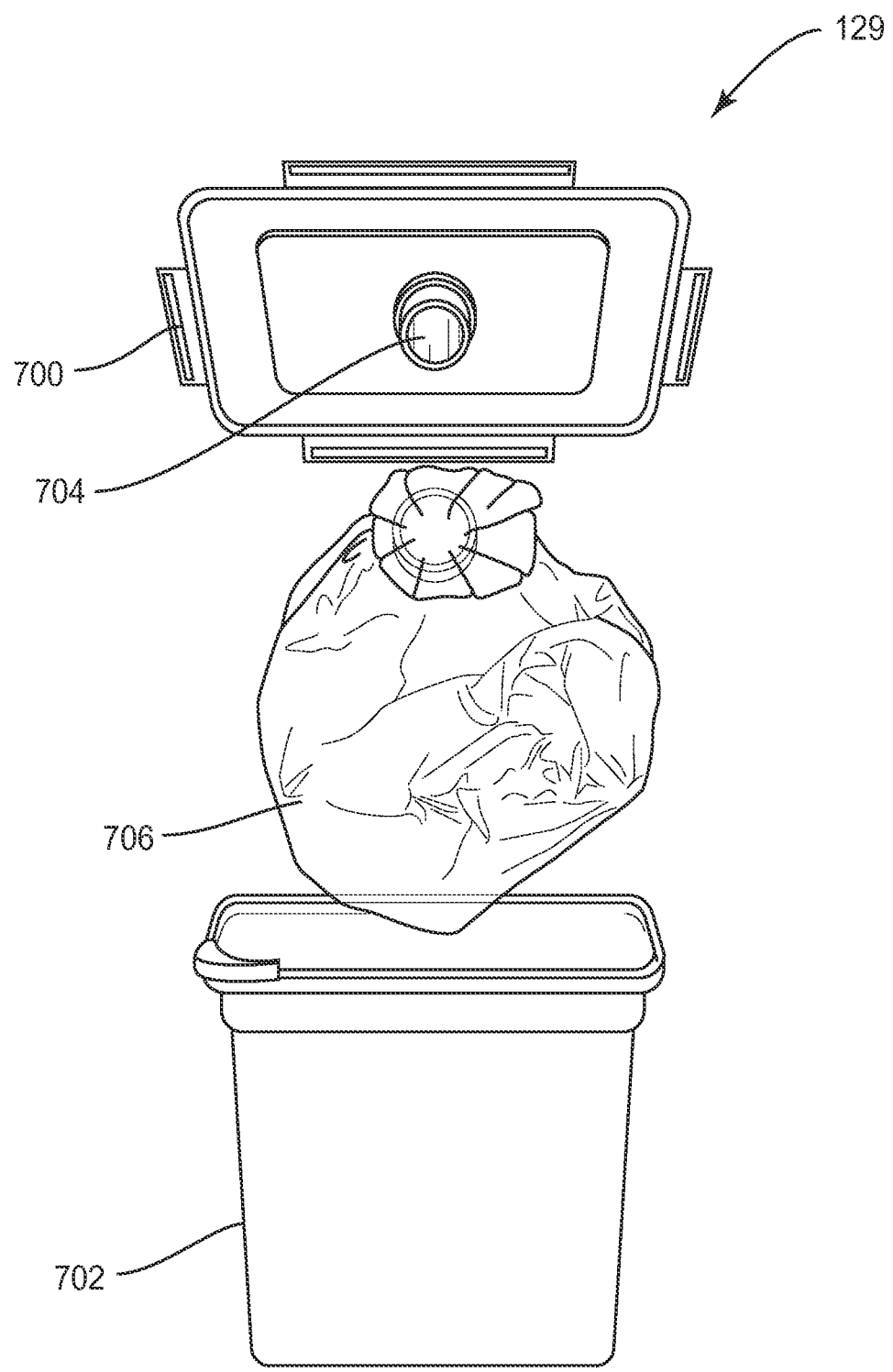
FIG. 7 is a side view of a disassembled lower portion of the insect trap shown in FIG. 1.

FIG. 7 illustrates a side view of a disassembled lower portion 129 of the insect trap 124 shown in FIG. 1. Referring to FIG. 7, the lower portion 126 includes a top component 700 and a bottom component 702, which can be attached to one another. The top component 700 can define a narrow, extended opening 704, which can provide an air pathway to the insect trap's upper portion 124 shown in FIG. 1. The narrow opening 704 prevents insects from exiting the lower portion 129 after their entry from the upper portion 130. The interior of the lower portion 129 can be fitted with a plastic liner 706 to facilitate disposal of capture insects.

Figure 8:
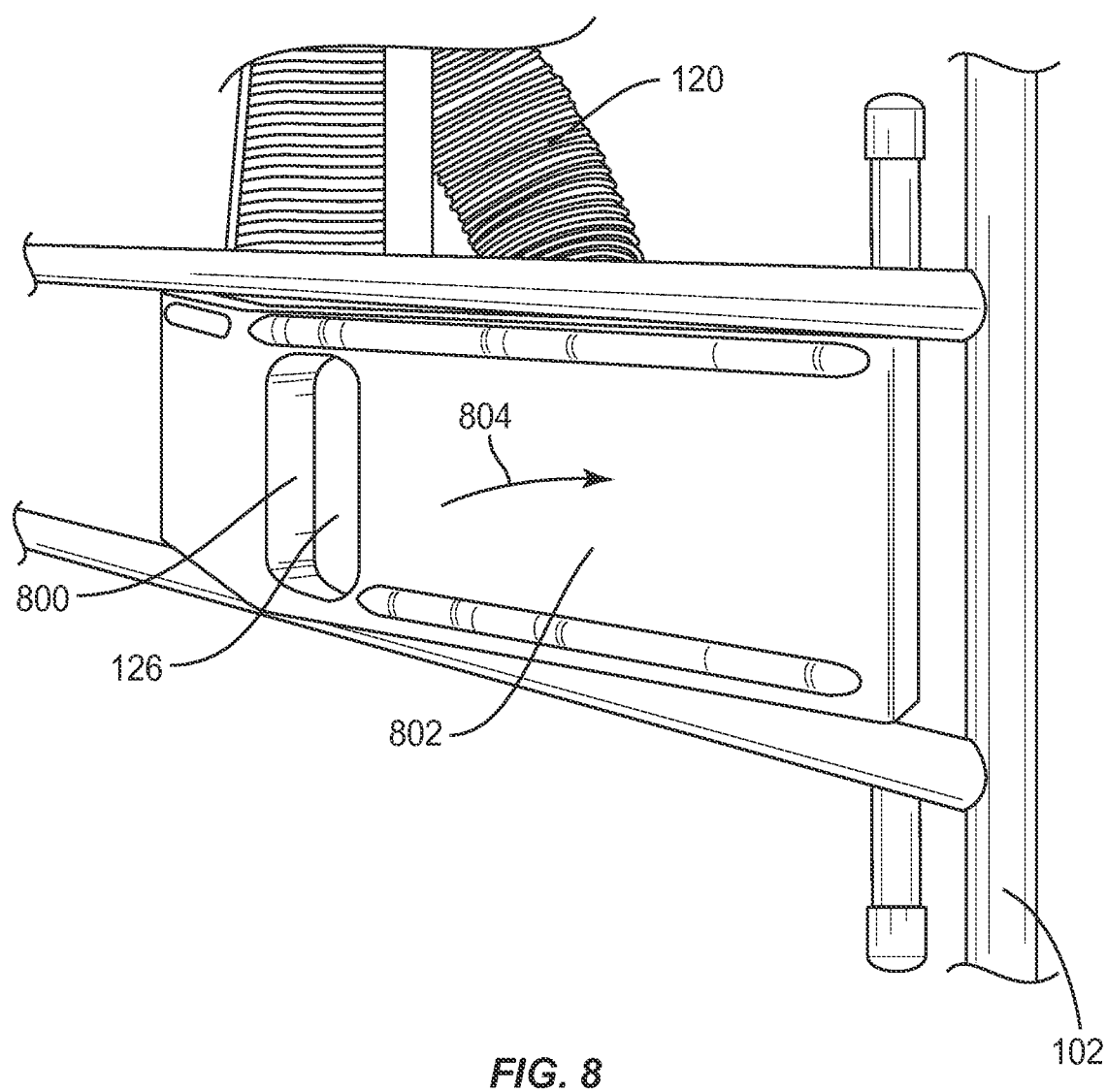
FIG. 8 is a side view of the end of an input duct in accordance with embodiments of the present disclosure.

FIG. 8 illustrates a side view of the end 126 of the input duct 120 in accordance with embodiments of the present disclosure. Referring to FIG. 8, the end 126 is shown in this view from a position within the pathway 104. The input duct's end 126 is shown in a first position within the pathway 104. The end 126 may be moved to a second position outside of the pathway 104 as needed to allow for movement of livestock through the pathway 104. The end 126 can include a component 802 being pivotally attached to a hinge to facilitate movement of the end 126 between the first and second positions. The hinge can be connected to the frame structure 102. The end 126 may be mechanically biased, such as by a biasing mechanism, to a position within the pathway. As livestock moves through the pathway 104 and touches the end 126, force generated by the livestock on the component 802 as the livestock moves through the pathway is sufficient to overcome the biasing force to move the component 802 between the first and second positions or to the first position the end 126. The end 126 moves in a direction indicated by direction arrow 804 when the force is sufficient to overcome the biasing force. The component 802 may move along the contour of the livestock such that the end can be closer to insects on or around the livestock for facilitating the removal of the insects by the air flow. An opening of the end 126 for receiving insects inside the input duct 120 is designated by reference numeral 800.

Referring again to FIG. 1, the end 128 of the output duct 122 may move in directions indicated by direction arrow 134. As shown in FIG. 1, the duct's end 128 is shown in a first position directed towards the pathway 104. The end 128 may be moved in a swivel motion to different positions within the pathway 104. In an example, the end 128 may point towards the entrance to the pathway 104 in its furthest position in one direction, and may point towards the exit of the pathway 104 in its furthest position in the other direction. The end 128 can move between the various positions as livestock moves through the pathway 104.

Input ducts of any size, shape, and number can be positioned along a pathway of livestock for removing insects. Further, the vacuum device can include any number of fans or other devices suitable for pulling air through the input ducts for removing insects from livestock. In addition, output ducts of any size, shape, and number can be positioned along a pathway of livestock for dislodging insects from livestock or moving insects from an area surrounding livestock.

In accordance with embodiments of the present disclosure, a method for removing insects from livestock may include providing one of the systems described herein and operating the system in accordance with the description provided herein. For example, one of the systems can be attached to a dairy parlor through which cattle move. The pathway of the system can be aligned with the pathway of the parlor such that cattle move through the pathway of the system as described herein. The system's vacuum device can then be activated (or turned on) as cattle move through the pathway such that one or more insects, such as flies, on the cattle are drawn into the input ducts and moved to the insect trap as described herein. Further, air output by the output duct(s) can dislodge insects from the cattle or move the insects from an area surrounding the cattle. After insects collect in the insect trap, the insect trap can be emptied of the collected insects as described herein.

While the embodiments have been described in connection with the various embodiments of the figures, it is to be understood that other similar embodiments may be used or modifications and additions may be made to the described embodiments for performing the same function without deviating therefrom. Therefore, the disclosed embodiments should not be limited to any single embodiment, but rather should be construed in breadth and scope in accordance with the appended claims.

What is claimed:

1. A livestock insect-removal system comprising:
   a structure defining a pathway for passage of livestock;
   a duct comprising first and second ends defining first and second openings, respectively, wherein the first opening is positioned along the pathway such that the livestock moving through the pathway passes near the first opening; and
   a vacuum device connected to the second opening and configured to draw air through the duct and away from an area surrounding the first opening such that one or more insects are displaced from the livestock or an area surrounding the livestock when the livestock passes near the first opening.

2. The system of claim 1, wherein the first end is connected to the structure.

3. The system of claim 1, wherein the first end is configured for movement between a first position and a second position within the pathway such that the first end can move along an outside surface of the livestock as the livestock moves through the pathway.

4. The system of claim 3, wherein the first end is pivotally mounted to the structure for movement of the first end between the first and second positions.

5. The system of claim 3, wherein the first end is configured to pivot in a direction of movement of the livestock through the pathway.

6. The system of claim 3, wherein the first end is biased for movement to the first position, wherein the first position is located closer to a center of the pathway than the second position.

7. The system of claim 1, wherein the vacuum device is connected to the structure.

8. The system of claim 1, wherein the duct is a first duct, and wherein the vacuum device further comprises a second duct having first and second ends, the first end of the second duct being connected to an outlet of the vacuum device for receiving output air from the vacuum device, the second duct being adapted to communicate the output air to the second end of the second duct, wherein the second end of the second duct is positioned along the pathway to output the output air into the pathway for dislodging one or more insects from an area on or near the livestock.

9. The system of claim 8, wherein the structure defines a top, a first side, and a second side of the pathway, wherein the second end of the second duct is positioned at or near one of the first and second sides for dislodging one or more insects from an area on or near the livestock.

10. The system of claim 1, wherein the structure defines a top, a first side, and a second side of the pathway, wherein the first opening is positioned at or near one of the first and second sides of the pathway for removing insects positioned on or near a side of the livestock.

11. The system of claim 1, wherein the structure defines a top, a first side, and a second side of the pathway, wherein the first opening is positioned at the top of the pathway for removing insects positioned on or near a top of the livestock.

12. The system of claim 1, wherein the vacuum device is configured to draw the displaced insects into the duct, and
   wherein the system further comprises an insect trap in air pathway communication with the duct for receiving the displaced insects drawn into the duct.

13. The system of claim 12, wherein the insect trap defines an interior space and comprises a door for trapping the insects within the interior space.

14. The system of claim 12, further comprising a material positioned for covering the structure.

15. The system of claim 1, further comprising a vacuum device container defining an interior space for holding the vacuum device.

16. The system of claim 15, further comprising a light source positioned in or near the container for attracting insects.

17. The system of claim 15, wherein the vacuum device container includes an inlet for receiving the second end of the duct.

18. The system of claim 17, wherein the vacuum device container includes an outlet outputting air from the vacuum device.

19. The system of claim 15, wherein the vacuum device container comprises a screen for partitioning the interior space of the vacuum device container into first and second spaces, wherein the vacuum device is positioned within the first space, and wherein the second opening of the duct is in direct air pathway communication with the second space such that the screen at least partially prevents debris and insects drawn into the second space from moving into the first space.

20. A method for removing insects from livestock, the method comprising:

providing a structure defining a pathway for passage of livestock;

providing a duct comprising first and second ends defining first and second openings, respectively, wherein the first opening is positioned along the pathway such that the livestock moving through the pathway passes near the first opening; and activating a vacuum device connected to the second opening to draw air through the duct and away from an area surrounding the first opening such that one or more insects are displaced from the livestock or an area surrounding the livestock when the livestock passes near the first opening.

* * * * *